United States Patent [19]
Ando

[11] Patent Number: 4,931,891
[45] Date of Patent: Jun. 5, 1990

[54] MAGNETIC DISC PLACK LOADING MECHANISM WITH SHUTTER OPENING AND CLOSING MECHANISM

[75] Inventor: Shigeru Ando, Minato, Japan
[73] Assignee: Fuji Photo Film Co., Ltd., Kanagawa, Japan
[21] Appl. No.: 390,859
[22] Filed: Aug. 8, 1989

Related U.S. Application Data

[62] Division of Ser. No. 129,115, Dec. 4, 1987, Pat. No. 4,879,616.

[30] Foreign Application Priority Data

Dec. 4, 1986 [JP] Japan .............................. 61-289820
Dec. 15, 1986 [JP] Japan .............................. 61-298412

[51] Int. Cl.$^5$ ............................................. G11B 5/012
[52] U.S. Cl. ................................................. 360/99.06
[58] Field of Search ............................. 360/99.06, 96.5

[56] References Cited

U.S. PATENT DOCUMENTS

4,802,041 1/1989 Uehara .............................. 360/99.06

Primary Examiner—A. J. Heinz
Attorney, Agent, or Firm—Sughrue, Mion, Zinn, Macpeak & Seas

[57] ABSTRACT

A magnetic disc pack loading mechanism used in a magnetic recording/reproducing apparatus in an electronic still camera or the like is disclosed which power loads a magnetic disc pack in a predetermined recording or reproducing position by moving a pack holder containing the magnetic disc pack therein. The loading mechanism is provided with a pre-lock mechanism which can secure provisionally the magnetic disc pack within the pack holder when the magnetic disc pack has been inserted into the pack holder and a shutter opening/closing mechanism which can open fully a shutter in the magnetic disc pack cooperatively with the loading operation.

2 Claims, 11 Drawing Sheets

MAGNETIC DISC PLACK LOADING MECHANISM WITH SHUTTER OPENING AND CLOSING MECHANISM

This is a Division of application Ser. No. 07/129,115, filed 12/4/87 U.S. Pat. No. 4,879,616,

BACKGROUND OF THE INVENTION

1. Field of the Invention

The present invention relates to a magnetic disc pack loading mechanism and, in particular, to a mechanism for loading a magnetic disc pack containing therein a magnetic disc in which still image information or the like can be magnetically recorded.

2. Description of the Related Art

Recently, there has been developed an electronic still camera system in which an image pickup device such as a solid image pickup element, an image pickup tube or the like is combined with a recording device employing as a recording medium thereof an inexpensive magnetic disc having a relatively larger storage capacity such that an object can be still photographed electronically and recorded into a rotating magnetic disc and the reproduction of the recorded image can be performed by means of a television system, a printer or the like which is provided separately from the electronic still camera system.

The magnetic disc that is employed in such camera system is usually used in the form of a magnetic disc pack. That is, in such magnetic disc pack, there is stored a magnetic disc in a rotatable manner which is capable of magnetic recording of still image information or the like, this magnetic disc pack is mounted to a magnetic recording device incorporated in an electronic camera or to a reproducing device arranged integrally with or separately from the magnetic recording device before it is used.

The mounting of the above-mentioned magnetic disc pack is generally carried out by moving a pack holder in which the magnetic disc pack is stored.

Also, this type of magnetic disc pack is provided with a shutter which is used to protect the magnetic disc against dust or the like except during the recording/reproducing operation. And, this shutter can be opened by a shutter openign/closing mechanism provided usually in the side portion of the pack holder when the magnetic disc pack is inserted into the pack holder, and can be closed when the magnetic disc pack is discharged out from the pack holder.

By the way, there are two types of pack holders: that is, one is a hinge type of pack holder; and, the other is slot-in type of pack holder. The pack holder of a slot-in type is used when the magnetic disc pack is power loaded and is generally provided with a pop-up mechanism which is used to push out the magnetic disc pack from the pack holder in an unloading operation.

Conventionally, when the magnetic disc pack is mounted by use of the pack holer of such slot-in type, an operator must continue to push the magnetic disc pack by hand until the magnetic disc pack is inserted into the pack holder, a loading operation by the pack holder is initiated and the pop-up mechanism for pushing out the magnetic disc pack is locked, which is very troublesome (Japanese Patent Application No. 60-284574).

Also, the slot-in type of pack holder is equipped with an insertion opening which is used to insert the magnetic disc pack into the pack holder and which is also provided with an inwardly open, inner cover. There is a problem, however, that the inner cover interferes with the above-mentioned shutter opening/closing mechanism. In order to prevent such interference, it is necessary to provide the shutter opening/closing mechanism in the depth direction of the pack holder. In this case, in order to open fully the shutter of the magnetic disc pack, the magnetic disc pack must pushed in very deeply, that is, it must be pushed in until the following end thereof is moved more deeply than an insertion opening in a front panel. It is impossible to carry out such insertion of the magnetic disc pack by hand.

SUMMARY OF THE INVENTION

The present invention aims at eliminating the drawbacks found in the above-mentioned prior art devices.

Accordingly, it is an object of the invention to provide a magnetic disc pack loading mechanism which is capable of provisionally securing a magnetic disc pack within a pack holder when the magnetic disc pack is inserted into the pack holder in a given amount of insertion.

It is another object of the invention to provide a magnetic disc pack loading mechanism which allows a shutter provided in the magnetic disc pack to be opened or closed in a position as deep as possible from an insertion opening so as to be able to secure space for prevention of interference between an inner cover and a shutter opening/closing mechanism.

According to one aspect of the present invention, there is provided a magnetic disc pack loading mechanism which is adapted to position a magnetic disc pack in a recording or reproducing position by moving a pack holder containing therein the magnetic disc pack in the same direction with the insertion direction of the magnetic disc pack and then moving the pack holder in the longitudinal direction of a rotary drive shaft perpendicular to the above-mentioned magnetic disc pack insertion direction, wherein there is provided in the pack holder a pop-up member which is free to advance or retreat, is provided in the leading end thereof with an engagement portion positioned in an insertion area for the magnetic disc pack within the pack holder, and is energized by a spring in a direction to discharge the magnetic disc pack; there is provided in the pack holder a pre-lock lever which is free to rotate and is energized by a spring in a direction where an engagement portion provided in the leading end of the pre-lock lever can be brought into engagement with the magnetic disc pack; and, there is provided a cam mechanism between the above-mentioned pop-up member and pre-lock lever. In other words, if the magnetic disc pack is inserted into the pack holder against the return force of the pop-up member to advance the pop-up member a given distance, then the pre-lock lever is rotated by the cam mechanism interposed between the pop-up member and the pre-lock lever and the magnetic disc pack is provisionally secured within the pack holder by the rotational movements of the pre-lock lever. Also, during this operation, the pop-up member is being locked by the cam mechanism so that the pop-up member is prevented from returning to its original position.

Also, according to another aspect of the invention, there is provided a magnetic disc pack loading mechanism which is adapted to position a magnetic disc pack in a recording or reproducing position by moving a pack holder containing therein the magnetic disc pack in the same direction with the insertion direction of the magnetic disc pack and then moving the pack holder in the longitudinal direction of a rotary drive shaft perpendicular to the above-mentioned magnetic disc pack insertion direction, wherein there is provided a slide plate movable together with the pack holder only in the above-mentioned rotary drive shaft direction when the magnetic disc pack is positioned, and wherein in the slide plate there are provided a shutter opening member a portion of which can be projected into an insertion area for the magnetic disc pack within the pack holder to remove the locking of a shutter in the magnetic disc pack, and a shutter closing member provided with a claw engageable with a bore formed in the side surface of the shutter, the claw being adapted to be able to project resiliently into the above-mentioned magnetic disc pack insertion area. In other words, if the magnetic disc pack is inserted into the pack holder, then the shutter of the magnetic disc pack climbs over the claw of the shutter closing member and is then brought into contact with the shutter opening member to thereby remove the locking of the shutter. Then, the claw provided in the shutter closing member is brought into engagement with the bore formed in the shutter side surface. And, if the magnetic disc pack is inserted to a given position where it can be inserted by hand, then the shutter can be opened little by little along with such insertion, but, in this position, the shutter is not yet opened fully. After then, if a loading operation is performed by the pack holder in the same direction with the magnetic disc pack insertion direction, then, as the pack holder is moved, the shutter is again opened to its fully open state. Successively, when the pack holder is moved in a direction perpendicular to the above-mentioned insertion direction, then the shutter opening and closing members provided in the slide plate are moved to follow after the pack holder. On the other hand, when the magnetic disc pack is taken out from the pack holder, the shutter is at first closed by the shutter closing member a given amount due to the movement of the pack holder in the pack holder discharge direction, and if the magnetic disc pack is drawn further, then the shutter is closed until it is locked by the shutter closing member.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the preferred embodiment of a mechanism for loading a magnetic disc pack according to the present invention with reference to the accompanying drawings.

Figure 16:
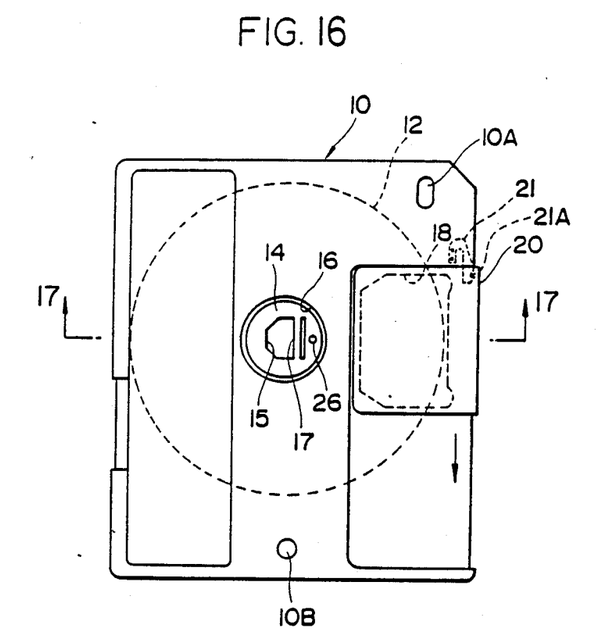
FIG. 16 is a plan view of the magnetic disc pack used in the illustrated embodiment of the invention.
Figure 17:
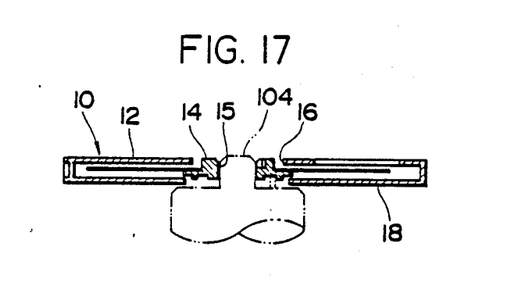
FIG. 17 is a section view of the magnetic disc pack taken along the line A—A in FIG. 16.

At first, description will be given of a magnetic disc pack which is used in a magnetic recording or reproducing apparatus in an electronic camera or the like. In FIG. 16, there is shown a plan view of the above-mentioned magnetic disc pack designated by 10 and, in FIG. 17, there is shown a section view thereof taken along the line A—A in FIG. 16.

As shown in FIG. 16, the magnetic disc pack 10 is constructed in a substantially square shape and within the magnetic disc pack 10 there is stored a magnetic disc 12 in a freely rotatable manner in which still image information or the like can be recorded. In the central portion of the magnetic disc there is provided as a reinforcing member a center core 14 which is exposed externally from an annularly-shaped opening 16 formed in the magnetic disc pack 10. The center core 14 is formed with a central bore 15 and the central bore 15 is in turn provided with a resilient piece 17. The central bore 15 in the center core 14 can be fitted over a drive shaft 104 to be described later against the energization force of the resilient piece 17.

Also, the magnetic disc pack 10 is formed with a window portion 18 in which a magnetic head to be described later is positioned and the window portion 18 can be opened or closed by a slidable shutter 20. In other words, before the magnetic disc pack 10 is inserted into a pack holder to be described later, the shutter 20 closes the window portion 18 to protect the magnetic disc 12 against dust and, after the magnetic disc pack 10 is inserted into the pack holder, the shutter 20 is secured by a claw provided in the pack holder and is moved in a downward direction in FIG. 15 to open the window 18.

Figure 18:
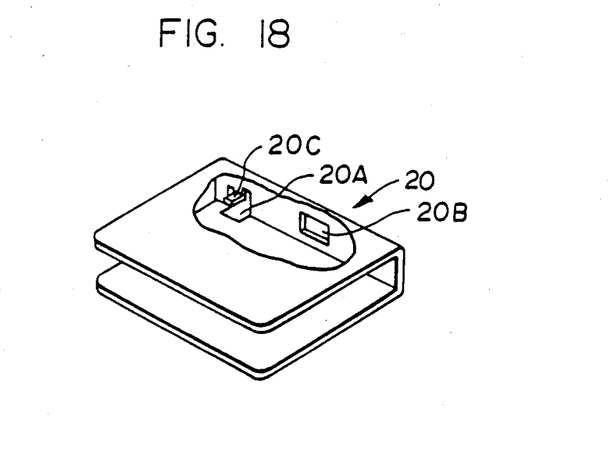
FIG. 18 is a perspective view of a shutter employed in the illustrated embodiment of the invention; and, FIG. 19 is a view to illustrate the side end of the magnetic disc pack employed in the illustrated embodiment of the invention.

As shown in FIG. 18, the shutter 20 is bent formed in a substantially U-like shape and is slidably mounted to the magnetic disc pack 10 from one edge (in FIG. 16, from the right edge) of the magnetic disc pack 10 in such a manner that the magnetic disc pack 10 is put between the two flat surfaces of the shutter 20.

Figure 19:
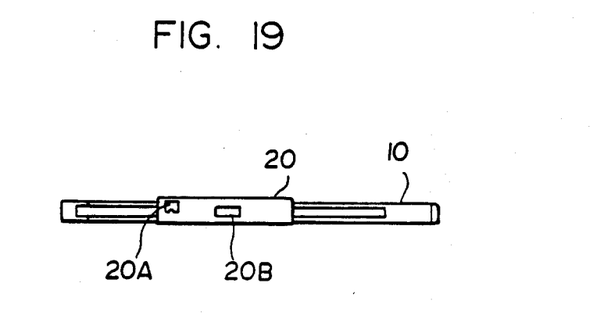

In the shutter 20, as shown in FIGS. 18 and 19, there are formed bores 20 A and 20 B. The bore 20 A is provided with a projection 20 C which is formed in a folded manner. The projection 20 C can be brought into enagagement with a recessed portion 21 A (which is shown in FIG. 16) formed in a lock member 21 to lock the shutter 20 in an immovable manner.

Further, the magnetic disc pack 10 is formed with positioning bores 10 A, 10 B which are used to position the magnetic disc pack 10 in a position for magnetic recording or reproduction. The structure of the above-mentioned magnetic disc pack is defined by a unified standard.

Figure 1:
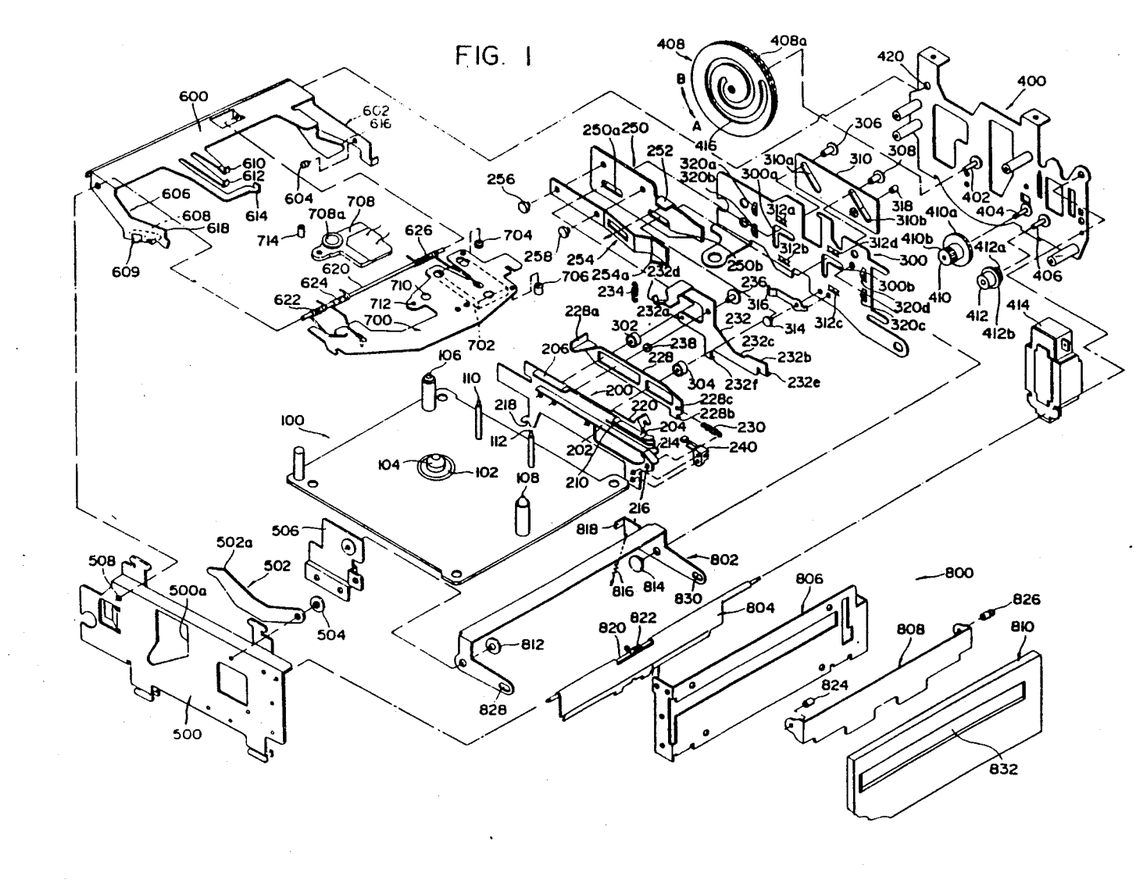
FIG. 1 is an exploded, perspective view to show the whole structure of a magnetic recording/reproducing apparatus in which an embodiment of a magnetic disc pack loading mechanism according to the invention is employed.

Referring now to FIG. 1, there is shown an exploded perspective view of an example of a magnetic recording/reproducing apparatus to which the present invention is applied. The illustrated magnetic recording-/reproducing apparatus comprises, as its major components, a support plate 100, a pack holder 200, a side plate 300, a right-side frame 400, a left-side frame 500, a main arm 600, a regulation plate holder 700, and a cover opening/closing mechanism 800.

Referring at first to the internal structure of the support plate, the support plate 100 is equipped with a motor 102 which is used to drive the magnetic disc. The magnetic disc driving motor 102 has a drive shaft 104 which can be fitted into the central bore 15 in the center core 14 of the magnetic disc pack 10 shown in FIG. 16 to rotate the magnetic disc 12 at a given number of rotations within the magnetic disc pack 10.

Also, in the support plate 100, there are provided a magnetic head which is not shown, a head carriage to which the magnetic head is mounted, and a feed motor which is used to move the head carriage by means of a lead screw. If the feed motor is rotated every given number of rotations, then the rotational movement of the feed motor is transmitted to the lead screw through a reduction gear. By means of the rotational movement of the lead screw, the head carriage is then moved every given pitch in the axial direction of the lead screw and at the same time the magnetic head is also moved in the radial direction of the magnetic disc 12. That is, the magnetic head is moved in this manner to thereby magnetically record still image information or the like onto the magnetic disc 12, for each of tracks provided on the magnetic disc 12 or reproduce therefrom. In FIG. 1, reference numerals 106, 108 respectively designate positioning pins used to position the magnetic disc pack, over which positioning pins 106, 108 the positioning bores 10 A, 10 B (FIG. 16) are to be fitted, respectively. Also, numerals 110, 112 respectively designate pins used to position the height of a regulation plate 702, over which pins 110, 112 are fitted bored pins 704, 706 mounted to the regulation holder 700, respectively.

In the pack holder 200, there are provided guide pieces 202, 204, 206 forming a guide groove which is used to guide and support the side (the right side in FIG. 16) of the magnetic disc pack 10 in which the shutter 20 is provided, a groove 210 into which a shutter opening member 252 and a claw 254a of a shutter closing member 254 can be inserted, and a slider surface 220 engageable with a lever 802 for opening or closing a second cover 808. Also, there is interposed a spring 230 between a bore 228c formed in a pop-up member 228 and a bore 216 on the side of the pack holder, and, similarly, there is interposed a spring 234 between a bore 232a formed in a pre-lock lever 232 and a hook 218 on the side of the pack holder. The above-mentioned pre-lock lever 232 is rotatably mounted to the pack holder 200 by means of pins 236, 238. Further, in the pack holder 200, there is provided a leaf switch 240 which is used to confirm that the magnetic disc pack has been inserted.

The above-mentioned pack holder 200 is mounted to the side plate 300 by pins 306, 308 by means of a spacer 302, 304, and elongated bores 250a, 250b formed in a vertical slide plate 250 to be discussed later.

The above-mentioned vertical slide plate 250 is guided by four projections 320a, 320b, 320c, 320d respectively formed in the side plate 300 in such a manner that it is free to slide in a vertical direction along the side plate 300. Also, the vertical slide plate 250 is provided with a bent formed shutter opening member 252 and a shutter closing member 254 is mounted to the vertical slide plate 250 by pins 256, 258.

On the other hand, between the pack holder 200 and two spacers 302, 304 there is interposed the pop-up member 228 which is free to slide longitudinally (that is, in the magnetic disc pack insertion/discharge direction) along the pack holder 200. Also, between the side plate 300 and two pins 306, 308 there is interposed a longitudinal slide plate 310 which is guided by four projections 312a, 312b, 312c, 312d respectively formed in the side plate 300 such that the longitudinal, slide plate 310 is free to slide in a longitudinal, that is, back-and-forth direction along the side plate 300. Further, in the side plate 300 there is arranged a lock removing spring 316 by means of a pin 314, and in the longitudinal slide plate 310 there is provided a cam follower 318.

In the frame 400 shown right in FIG. 1, there are projectingly provided three rotary shafts 402, 404, 406, and a double cam 408, a gear 410 and a gear 412 are mounted to the rotary shafts, respectively. Also, between the frame 400 and the side plate 300 there is interposed a motor 414 for power loading. The motor 414 has a drive shaft (not shown, but directed downward) which is provided with a worm gear. The worm gear is adapted to engage with the smaller gear 412a of the gear 412, the larger gear 412b of the gear 412 engages with the larger gear 410a of the gear 410, and the smaller gear 410b of the gear 410 engages with a gear 408a formed on the circumferential surface of the double cam 408. The double cam 408 is formed with a spirally-shaped cam groove 416 on one surface thereof which is shown, into which cam groove 416 the cam follower 318 provided in the longitudinal plate can be fitted, while the double cam 408 is formed with a sprially-shaped cam groove (not shown) on the other surface thereof, into which cam groove a cam follower 604 provided in the right arm 602 of the main arm 600 can be fitted.

In the frame 500 shown left in FIG. 1, there is arranged a sub-arm 502 by means of a pin 504 such that the sub-arm 502 is free to rotate, and there is arranged a member 506 which is used to regulate the position of the left side face of the magnetic disc pack 10 when the magnetic disc pack 10 is inserted into the pack holder.

Now, in the main arm 600, there is arranged a shaft 620 which is provided with three springs 622, 624, 626 and the left end of the shaft 620 is journaled to a bore 508 formed in the left-situated frame 500. Also, on the base portion of the right arm 602 of the main arm 600, there is projected a shaft (not shown) which is journaled to a bore 420 formed in the right frame 400. Due to this, the main arm 600 is free to rotate with respect to the right and left frames.

Also, in the leading end of the right arm 602 of the main arm 600, as described before, there is provided the cam follower 604; in the left arm 602 thereof, there are provided a support portion 608 used to support the left side portion of the magnetic disc pack 10, and a support portion 609 which is bent formed to support the sub-arm 502; and, in the central portion of the main arm 600 there are provided three center core push portions 610, 612, 614.

Referring then to the regulation plate holder 700, the holder 700 is provided with a regulation plate 702 in the lower surface thereof, and a P.G sensor 708 in the upper surface thereof. The P.G sensor 708 is arranged such that a detection portion 708 a thereof stands opposite to a bore 710 formed in the regulation plate holder 708, and the sensor is adapted to generate a pulse signal each time a magnetic generation portion 26 (FIG. 16) provided on the upper surface of the center core 14 is positioned in the above-mentioned bore 710. The pulse signal is used to detect the rotational phase of the magnetic disc 12. Also, a height positioning pin 714 for the regulation plate 702 to be abutted against the drive shaft 104 of the motor 102 of the regulation plate holder 700 is screwed into a position 712 which stands opposite to the drive shaft 104 of the motor 102.

The above-mentioned regulation plate holder 700 is held always horizontally by means of a three-point support method using the two support portions 616, 618 in the main arm 600 and the support portion 502a in the sub-arm 502. Also, the regulation plate holder 700 is energized downward by the three springs 622, 624, 626 provided in the shaft 620 to be mounted to the main arm 600.

In addition, in FIG. 1, there is shown a cover opening/closing mechanism 800 which is mainly composed of a lever 802, a frist cover 804, a front frame 806, a second cover 808, and a front panel 810. The lever 802 is mounted in a freely rotatable manner to the member 506 and the side plate 300 respectively by means of pins 812 and 814, and at the same time it is energized in a counterclockwise direction by a spring 816. Further, there is provided a bent piece 818 in the lever 802 and thus, when the bent piece 818 is brought into contact with the slide surface 220 of the pack holder 200, then the above-mentioned counterclockwise rotational movement of the lever 802 is regulated.

The first cover 804 is rotatably mounted to the right and left frames 400, 500 by means of a shaft 820 and also is energized counterclockwise by a spring 822 provided on the shaft 820 such that it is normally in contact with the front frame 806 interposed between the right and left frames 400 and 500. In the second cover 808, there are provided pins 824 and 826 which are in engagement with elongated bores 828 and 830 formed in the lever 802 by means of the front frame 806, respectively.

Next, description will be given below of the operation of the respective parts of the magnetic recording-/reproducing apparatus constructed in the above-mentioned manner.

Figure 2A:
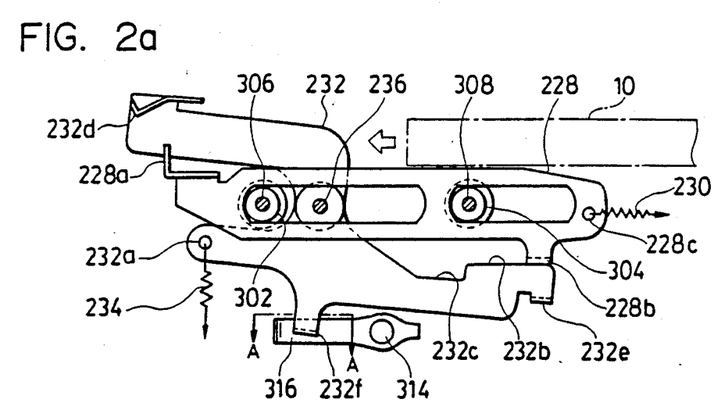
FIG. 2(a) is a front view of an embodiment of a pre-lock mechanism for a magnetic disc pack, illustrating a state of the pre-lock mechanism before the magnetic disc pack is pre-locked.

In FIG. 2(a), there is shown a state before the magnetic disc pack 10 is pre-locked. The pre-lock mechanism is mainly composed of the pop-up member 228 and the pre-lock lever 232. The pop-up member 228 is arranged such that it is free to slide back and forth, or, in a longitudinal direction with respect to the pack holder 200, and the pre-lock lever 232 is arranged such that it is free to rotate with respect to the pack holder 200.

Figure 2B:
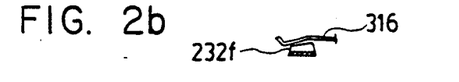
FIG. 2(b) is a section view taken along the line A—A in FIG. 2(a)

Although the pre-lock lever 232 is energized counterclockwise by the spring 234, when the contact surface 232b thereof is brought into contact with the contact piece 228b of the pop-up member 228, the pre-lock lever 232 is prevented from rotating further. Now, FIG. 2(b) is a section view taken along the line A—A in FIG. 2(a).

Figures 3A, 3B:
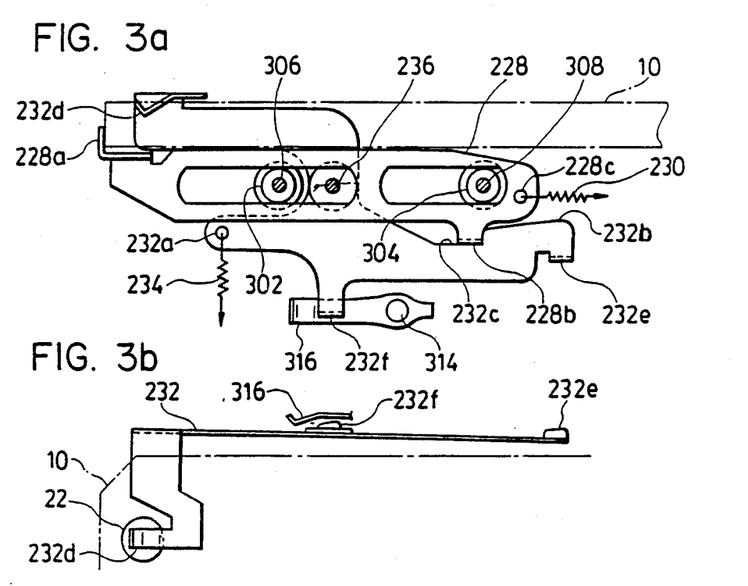
FIG. 3(a) is a front view of the above-mentioned pre-lock mechanism, illustrating a state thereof after the magnetic disc pack is pre-locked.
FIG. 3(b) is a plan view of FIG. 3(a)

In this state, the magnetic disc pack 10 is inserted into the pack holder to bring the front surface of the magnetic disc pack into contact with the engagement portion 228a of the pop-up member 228. After then, if the magnetic disc pack 10 is inserted further, then the pop-up member 228, together with the magnetic disc pack 10, is advanced against the energization force of the spring 230. And, when the pop-up member 228 is advanced a given distance so that the contact surface 228b thereof moves from the contact surface 232b of the pre-lock lever 232 to the contact surface 232c thereof then as shown in FIG. 3(a), the pre-lock lever 232 is rotated counterclockwise by an amount corresponding to the difference in level between the two contact surfaces. This rotational movement of the pre-lock lever 232 causes the engagement portion 232d provided in the leading end of the pre-lock lever 232 to move downward into engagement with the positioning bore 10 A previously formed in the magnetic disc pack 10. Now, FIG. 3(b) is a plan view of FIG. 3(a), illustrating a state in which the projection portion 232d of the pre-lock lever 232 is in engagement with the positioning bore 32 in the magnetic disc pack 10. The foregoing operations complete the pre-locking of the magnetic disc pack.

Figures 4A, 4B:
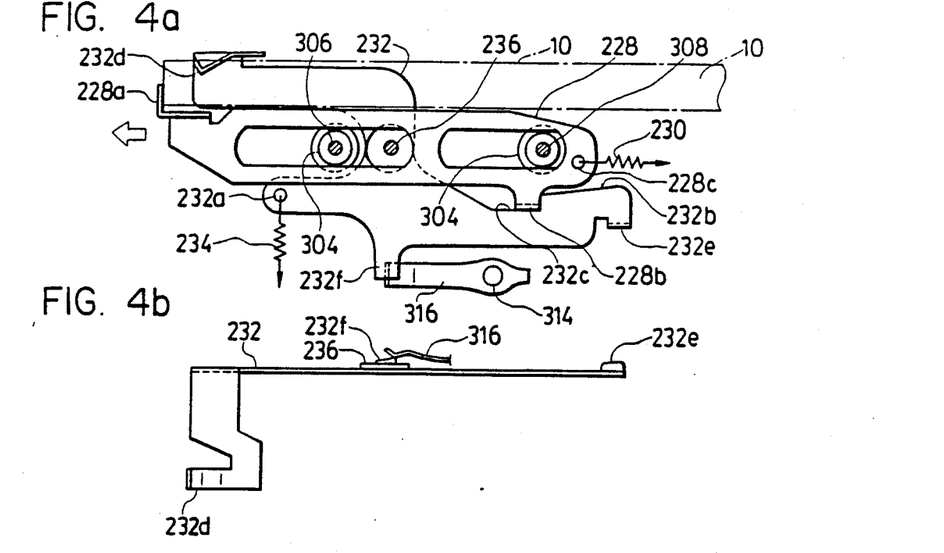
FIG. 4(a) is a front view of the pre-lock mechanism, illustrating a state thereof in which the pre-lock mechanism is advanced together with the magnetic disc pack after the magnetic disc pack is pre-locked.
FIG. 4(b) is a plan view of FIG. 4(a)

In FIG. 4, there is shown a state in which the magnetic disc pack 10 is loaded in an advancing direction after it is pre-locked. During this advancement, the bent portion 232f of the pre-lock lever 232 gets over the lock removing spring 316 provided in the lower portion of the side plate 300 while the bent portion 232f pushes against the spring.

Figures 5A, 5B:
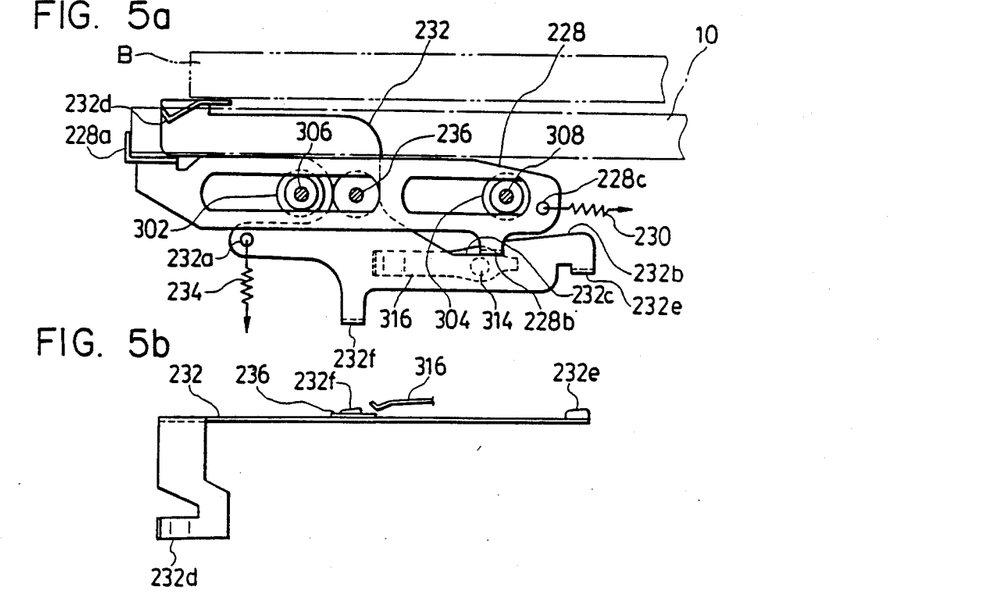
FIG. 5(a) is a front view of the pre-lock mechanism illustrating a state thereof in which the pre-lock mechanism is further advanced and is then lowered down together with the pre-locked magnetic disc pack.
FIG. 5(b) is a plan view of FIG. 5(a)

In FIG. 5, there is shown a state in which the magnetic disc pack 10 is further advanced and after then it is lowered down a given distance. In FIG. 5, a position illustrated by a two-dot chained line B shows the position of the magnetic disc pack 10 when it is initially pre-locked.

Figures 6A, 6B:
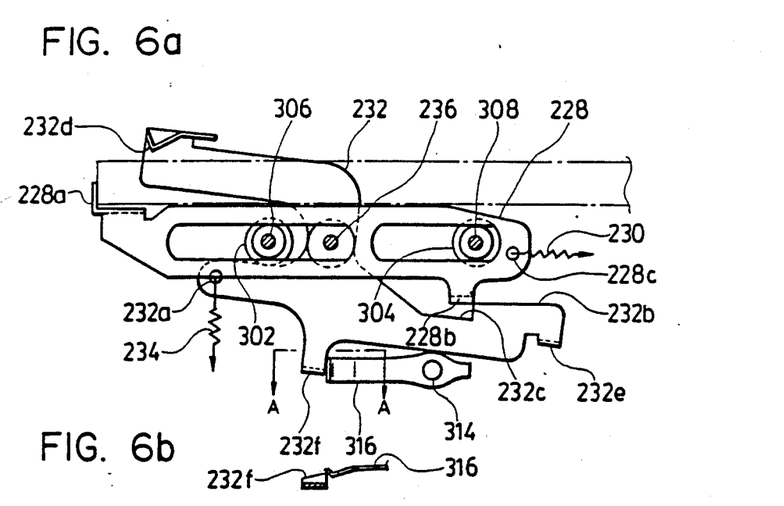
FIG. 6(a) is a front view of the pre-lock mechanism illustrating a state thereof in which the pre-locking of the magnetic disc pack is being removed.
FIG. 6(b) is a section view taken along the line A—A in FIG. 6(a)

Next, we will describe below how to remove the pre-locking. Referring to FIG. 6, there is shown a state in which the magnetic disc pack 10 together with the pre-lock mechanism are retreating, that is, moving in a right direction during the unloading of the magnetic disc pack. During this retreat, the bent portion 232f of the pre-lock lever 232 is brought into contact with the lock removing spring 316 to thereby rotate the pre-lock lever 232 clockwise until the lever to which the spring 234 is mounted is brought into contact with the circumferential surface of the spacer 302. As a result of this, the pre-locking by the pre-lock lever 232 is removed and the engagement between the pop-up member 228 and the pre-lock lever 232 is also removed, so that the pop-up member 228 can be operated by the energization force of the spring 230.

Figure 7A:
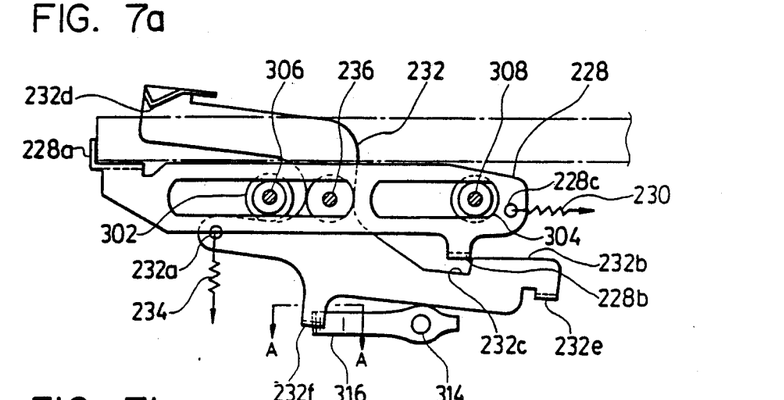
FIG. 7(a) is a front view of the pre-lock mechanism illustrating a state thereof in which after removal of the pre-locking of the magnetic disc pack the pre-lock mechanism is further retreated together with the magnetic disc pack.
Figure 7B:
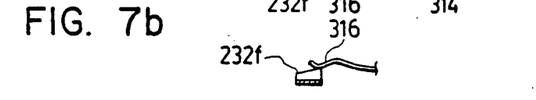
FIG. 7(b) is a section view taken along the line A—A in FIG. 7(a)

As shown in FIG. 7, when the above-mentioned unloading is carried out further, the bent portion 232f of the pre-lock lever 232 pushes and bends the lock removing spring 316 to get it over. As a result of this, the pre-lock mechanism returns to the state shown in FIG. 2.

Next, description will be given below of the operation of the set members (such as the main arm 600, regulation plate holder 700 and the like). In FIG. 1, if the double cam 408 is rotated in the direction of an arrow A, then the main arm 600, the cam follower 604 of which is fitted into the other cam groove (not shown) of the double cam 408, is rotated clockwise. As a result of this, the regulation plate holder 700, which is supported horizontally by three points, that is, the two support portions 616, 618 of the main arm 600 and the support portion 502a of the sub-arm 502 with one end thereof being guided into the guide bore 500a of the left frame 500, is caused to move down to a predetermined height while maintaining its horizontal state. And, when the main arm 600 is rotated a given amount, then the three center core push portions 610, 612, 614 of the main arm 600 push against the center core 14 of the magnetic disc 12 to thereby bring the central bore 15 of the center core 14 into firm engagement with the drive shaft 104.

Now, description will be given below of the pack holder moving mechanism.

Figure 8A:
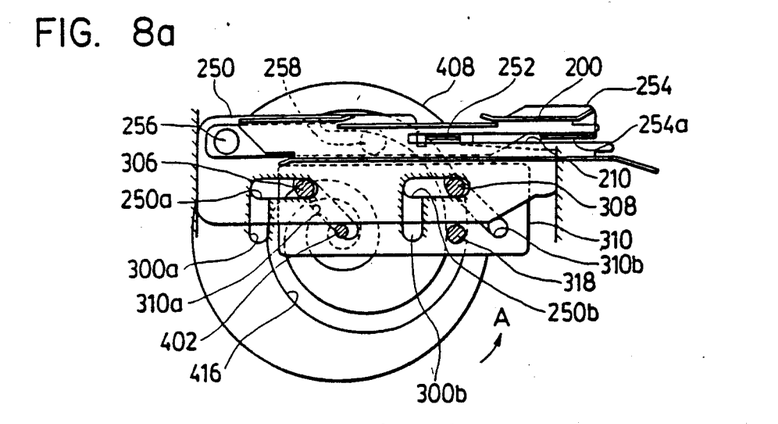
FIGS. 8(a), (b) and (c) are respectively views, illustrating the respective operational relationships between the pack holder and a shutter opening/closing mechanism.

In FIG. 8, during the loading of the magnetic disc pack, a driving force is transmitted from the motor 414 through the gears 412, 410 to the double cam 408, so that the double cam 408 is rotated in the direction of the arrow A, as shown in FIG. 8(a). When the double cam 408 is rotated in the arrow A direction, then the longitudinal slide plate 310, the cam follower 318 of which is fitted into the cam groove 416 in the double cam 408, is caused to advance, with the result that the pins 306, 308 are moved along substantially L-shaped bores 300a, 300b formed in the side plate 300 by oblique bores 310a, 310b formed in the longitudinal slide plate 310.

Figure 8B:
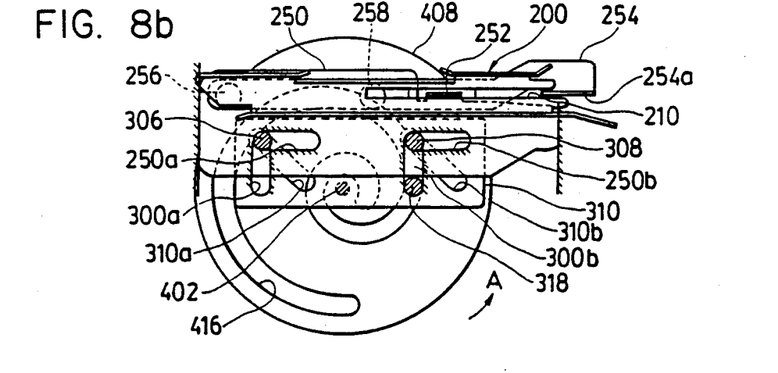
Figure 8C:
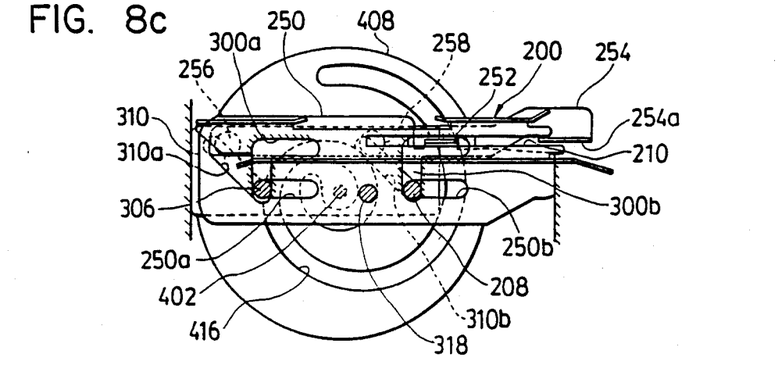

In other words, when the double cam 408 is rotated about 180° from its initial state shown in FIG. 8(a), then the pack holder 200 is moved to the end of advancement, as shown in FIG. 8(b). Then, when the double cam 408 is rotated about 180° further, then the pack holder 200 is moved down to the end of lowering, as shown in FIG. 8(c).

The double cam is also formed with two different cam grooves in order to prevent the above-mentioned main arm 600 against rotation while the pack holder 200 is advancing, to allow the main arm 600 to rotate synchronously with the pack holder 200 while the pack holder 200 is lowering, and to allow only the main arm 600 to rotate for center core pushing after the lowering of the pack holder 200 is completed.

Next, description will be given of the mechanism for opening or closing the shutter in the magnetic disc pack. As shown in FIG. 1 and FIG. 8, the shutter opening/closing mechanism is mainly composed of the vertical slide plate 250, shutter opening meber 252 and shutter closing member 254.

The vertical slide plate 250, as shown in FIG. 1, is guided by the four projections 320a through 320d provided in the side plate 300 and is free to slide along the side plate 300 only in the vertical direction. That is, as shown in FIG. 8, the pack holder 200 can be moved along the substantially L-shaped bores 300A, 300B formed in the side plate 300, while vertical slide plate 250 can be moved together with the pack holder 200 only in a direction perpendicular to the direction of insertion of the magnetic disc pack (in FIG. 8, in a vertical direction). In the vertical slide plate 250, there are formed two elongated bores 250a, 250b in order to prevent interference with the guide pins 306, 308 when the pack holder 200 is moved in the insertion/discharge direction of the magnetic disc pack (in FIG. 8, in the right and left direction).

Figure 10:
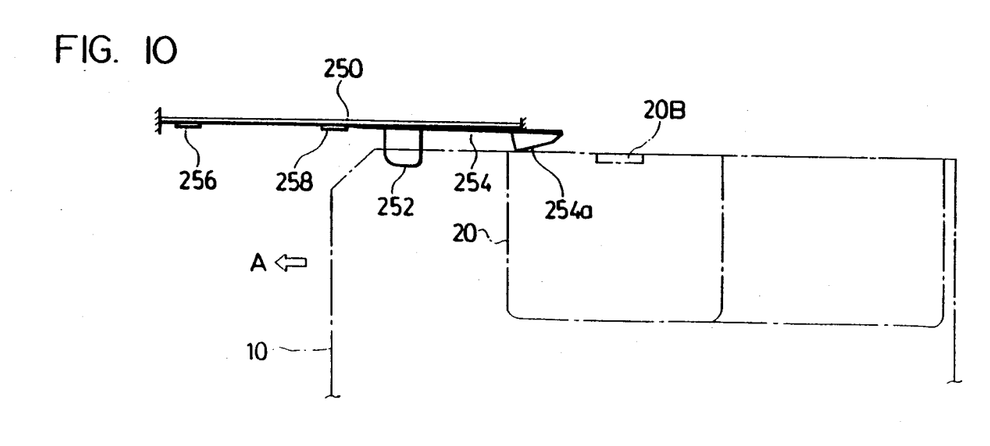

Also, as shown in FIG. 1, the above-mentioned vertical slide plate 250 is provided with the shutter opening member 252 which formed by folding, and also the shutter closing member 254 is mounted to the vertical slide plate 250 by means of the pins 256, 258. Further, the shutter closing member 254 is formed of a resilient member and, therefore, if the claw 254a of the shutter closing member 254 that is engageable with the bore 20A in the shutter side face is pushed against the resiliency thereof, then the claw 254a is caused to retreat, for example, as shown in FIG. 10. In addition, the shutter opening member 252 and the claw 254a of the shutter closing member 254 are arranged such that they can be projected into the insertion area of the magnetic disc pack 10 provided in the pack holder 200, as shown in FIG. 8.

Next, description will be given below of the operation of the above-mentioned shutter opening/closing mechanism with reference to FIGS. 9 through 14.

Figure 9:
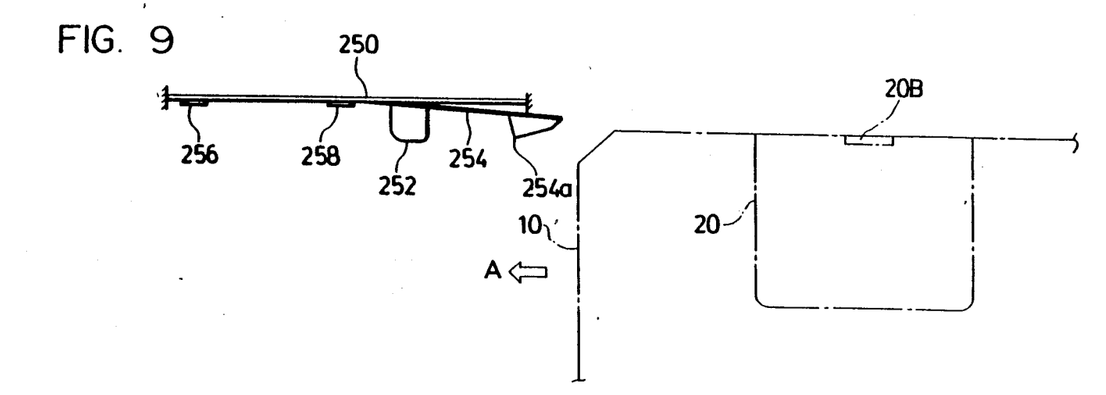
FIGS. 9 through 14 are respectively explanatory views used to explain the operation of the shutter opening/closing mechanism.

Referring to FIG. 9, there is shown a state in which the magnetic disc pack 10 is not yet inserted into the pack holder 200. If the magnetic disc pack 10 is inserted from the above state into the pack holder 200 as shown by the arrow A, then, as shown in FIG. 10, the shutter 20 of the magnetic disc pack 10 is firstly caused to push the shutter closing member 254 against the resiliency thereof and get over the claw 254a thereof.

Figure 11:
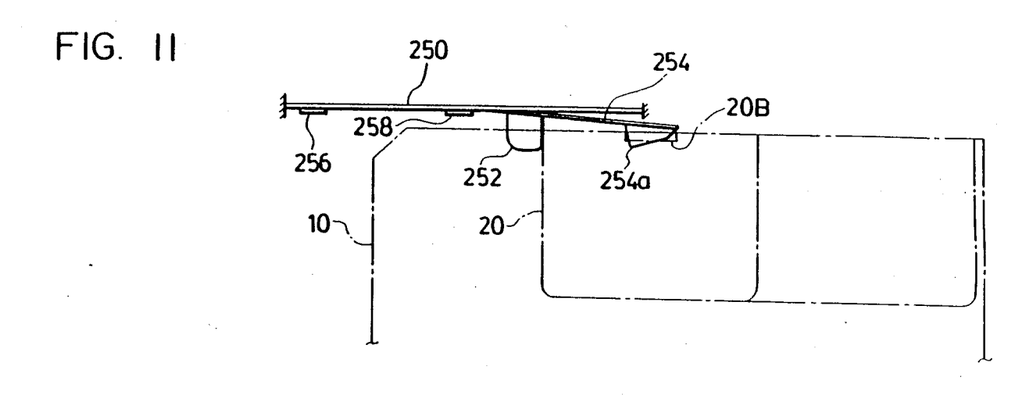

Also, when the magnetic disc pack 10 is inserted into the pack holder 200, then the leading end of the shutter 20 is brought into contact with the shutter opening member 252, as shown in FIG. 11. As a result of this, the shutter opening member 252 removes the locking of the shutter 20 by the lock member 21 (FIG. 16). Also, due to the fact that the bore 20B formed in the shutter side face is caused to move to the position of the claw 254a of the shutter closing member 254, the claw 254a is brought into engagement with this bore 20B and at the same time the shutter closing member 254 is caused to return to its initial position due to the resiliency thereof.

Figure 12:
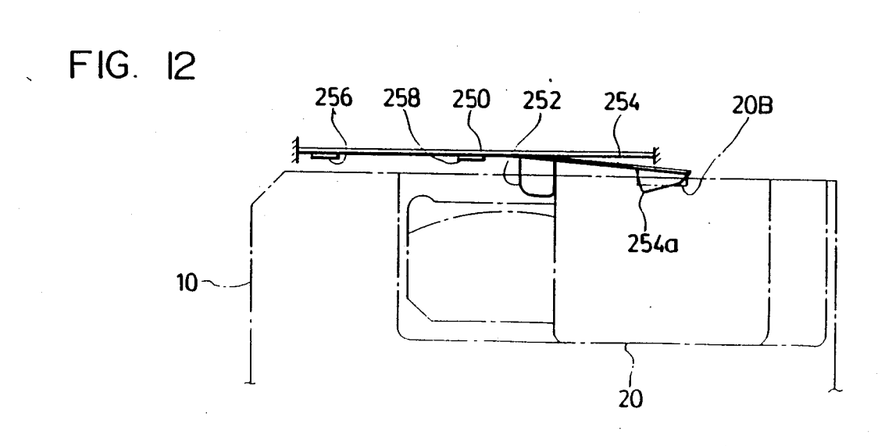

If the magnetic disc pack 10 is inserted from the state shown in FIG. 11 further into the pack holder, then shutter 20 can be opened by the shutter opening member 252, as shown in FIG. 12. The state shown in FIG. 12 illustrates a state in which the magnetic disc pack 10 has been inserted up to a given position (that is, the position as shown in FIG. 3 where the magnetic disc pack 10 is pre-locked). Also, as shown in FIG. 12, the shutter 20 is not yet opened fully.

Figure 13:
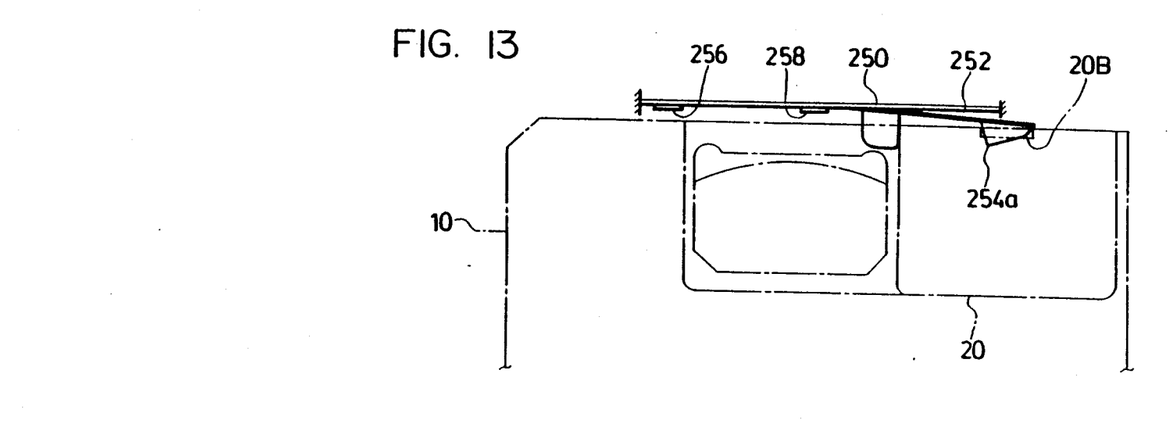

When the magnetic disc pack 10 is pre-locked in the pack holder 200 as described before, then the loading operation is started, as shown in FIG. 8. Then, if the pack holder 200 advances from the position thereof shown in FIG. 8(a) up to the position thereof shown in FIG. 8(b), then the magnetic disc pack 10 also advances together with the pack holder 200. On the other hand, the shutter opening/closing mechanism provided in the vertical slide plate 250 is not moved due to the fact that the movement thereof in the magnetic disc pack insertion direction is prevented, with the result that due to the relative movement between the vertical slide plate 250 and the magnetic disc pack 10 the shutter 20 can be opened until it opened fully, as shown in FIG. 13. During the movements of the pack holder 200 from FIG. 8(b) to FIG. 8(c), the vertical slide plate 250 follows after the pack holder 200, so that the state shown in FIG. 13 can be maintained.

Next, we will describe how to close the shutter 20 of the magnetic disc pack 10. In this case, at first, if the pack holder 200 is moved in the magnetic disc pack discharge direction from the state shown in FIG. 8(b) to the state shown in FIG. 8(a) during the unloading of the magnetic disc pack 10, then the shutter 20 is closed to the above-mentioned state shown in FIG. 12 and also, during the movement of the pack holder in the above-mentioned discharge direction, the pre-locking of the magnetic disc pack 10 is removed as shown in FIG. 6 so that the magnetic disc pack 10 can be moved further in the discharge direction, whereby the shutter 20 can be further closed. After then, if the magnetic disc pack 10 is pulled in the discharge direction (in FIG. 14, in the right direction), then the shutter 20 can be locked again by the lock member 21.

Figure 14:
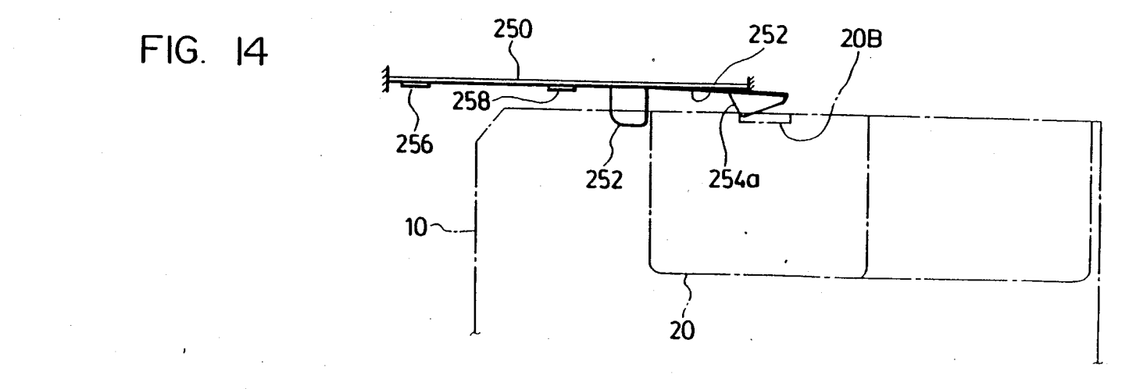

After the shutter 20 is locked, if the magnetic disc pack 10 is pulled further in the discharge direction, then, as shown in FIG. 14, the claw 254a of the shutter closing member 254 is caused to retreat against the resiliency of the shutter closing member 254 because the bore 20B in the shutter 20 is moved along the tapered surface of the claw 254a, so that the claw 254a can be disengaged from the bore 20B in the shutter 20.

Although in the illustrated embodiment the shutter closing member is formed of a resilient member, the present invention is not limited to this, but, alternatively, a shutter closing member may be rotatably provided in a vertical slide plate such that the claw of the shutter closing member may be energized by a spring so as to project into an insertion area for a magnetic disc pack provided in a pack holder.

Figure 15:
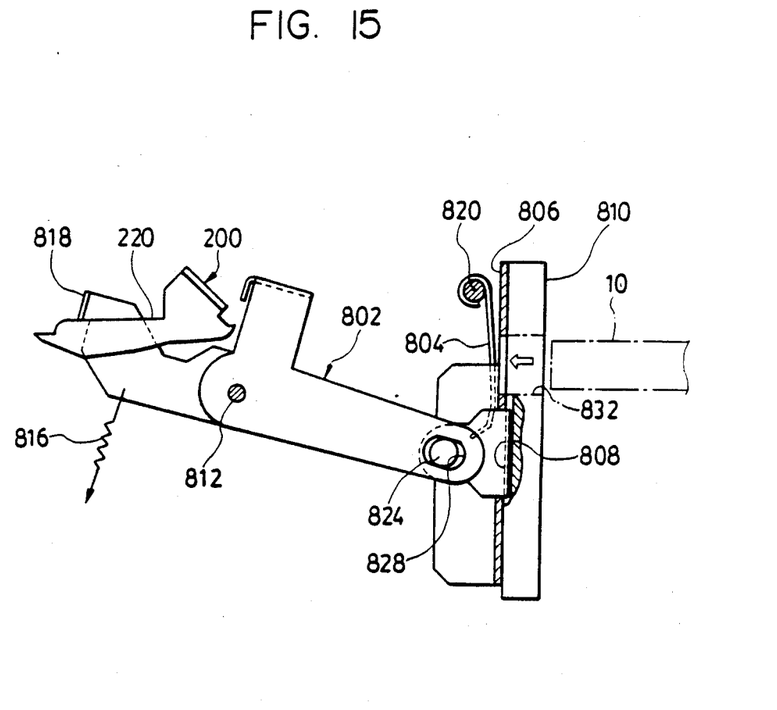
FIG. 15 is a view to illustrate a mechanism for opening or closing a cover.

Next, description will be given below of the mechanism for opening or closing the cover. In FIG. 15, the magnetic disc pack 10 is guided through the insertion opening 832 of the front panel 810, pushed against the first cover 804 and inserted into the pack holder 200, when the magnetic disc pack 10 is pre-locked to the pack holder 200 by the pre-lock mechanism, as shown in FIG. 3. After then, as the pack holder 200 is lowered down by the pack holder 200 moving mechanism (FIG. 8), the slide surface 220 of the pack holder 200 is also lowered down, so that the lever 802, with its bent piece 818 in contact with the slide surface 220, is rotated counterclockwise to thereby move the second cover 808 upwardly. As a result of this, the insertion opening 832 is closed by the second cover 808 to prevent the double insertion of the magnetic disc pack.

As has been described hereinbefore, in the magnetic disc pack loading mechanism according to the present invention, due to the fact that, during loading, the magnetic disc pack can be held positively in the pack holder, and also that the magnetic disc pack can be pre-locked when it is inserted a given amount, there is eliminated the inconvenience to continue pushing the magnetic disc pack until the beginning of the loading as in the prior art.

Also, according to the invention, since the shutter of the magnetic disc pack is adapted such that it can be fully opened by use of the loading operation in the insertion direction of the magnetic disc pack, the shutter opening member, shutter closing member and the like can be disposed in positions comparatively deeper from the magnetic disc pack insertion opening in the front panel, which can provide sufficient space inside of the front panel. As a result of this, there can be eliminated the inconvenience that the inner cover mounted rotatably inside of the front panel and the shutter closing member may interfere with each other, as in the prior art.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A magnetic disc pack loading mechanism for positioning a magnetic disc pack in a recording or reproducing position by moving a pack holder containing said magnetic disc pack therein in the same direction with the insertion direction of said magnetic disc pack and thereafter moving said pack holder in the longitudinal direction of a rotary drive shaft perpendicular to said magnetic disc pack insertion direction, said magnetic disc pack loading mechanism comprising:
    a slide plate movable together with said pack holder only in said rotary drive shaft direction when said magnetic disc pack is positioned;
    a shutter opening member provided in said slide plate and adapted such that, with a portion thereof being projected into an area for insertion of said magnetic disc pack within said pack holder, it can remove the locking of a shutter provided in said magnetic disc pack, and it can open fully said shutter of said magnetic disc pack stored in said pack holder when said pack holder is moved up to the extreme end of advancement thereof in said magnetic disc pack insertion direction; and,
    a shutter closing member provided with a claw engageable with a bore formed in the side face of said shutter and arranged in said slide plate such that said claw is disposed in a predetermined position with respect to said shutter opening member, said claw being able to resiliently project into said magnetic disc pack insertion area within said pack holder.

2. A magnetic disc pack loading mechanism as set forth in claim 1, wherein said shutter opening member is formed integrally with said slide plate.

* * * * *

UNITED STATES PATENT AND TRADEMARK OFFICE
CERTIFICATE OF CORRECTION

PATENT NO. : 4,931,891

DATED : June 5, 1990

INVENTOR(S) : Shigeru ANDO

It is certified that error appears in the above-identified patent and that said Letters Patent is hereby corrected as shown below:

On the title page, item [54] and in column 1, lines 2-4:

Delete the Title "MAGNETIC DISC PLACK LOADING MECHANISM WITH SHUTTER OPENING AND CLOSING MECHANISM" and insert --MAGNETIC DISC PACK LOADING MECHANISM WITH SHUTTER OPENING AND CLOSING MECHANISM--

Signed and Sealed this

Twenty-ninth Day of October, 1991

Attest:

HARRY F. MANBECK, JR.

*Attesting Officer*   Commissioner of Patents and Trademarks